(12) United States Patent
Lloyd et al.

(10) Patent No.: US 12,215,766 B1
(45) Date of Patent: Feb. 4, 2025

(54) MODULAR TORQUE CONVERTER STATOR WITH CAMMED BLADES

(71) Applicant: Schaeffler Technologies AG & Co. KG, Herzogenaurach (DE)

(72) Inventors: David Lloyd, Rittman, OH (US); Larry Chad Boigegrain, Copley, OH (US); Corey Hillegass, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/584,300

(22) Filed: Feb. 22, 2024

(51) Int. Cl.
*F16H 41/28* (2006.01)
*F16H 41/26* (2006.01)
*F16H 45/00* (2006.01)

(52) U.S. Cl.
CPC .............. *F16H 41/28* (2013.01); *F16H 41/26* (2013.01); *F16H 2041/285* (2013.01); *F16H 2045/002* (2013.01)

(58) Field of Classification Search
CPC .... F16H 41/28; F16H 41/26; F16H 2041/285; F16H 2045/002
See application file for complete search history.

(56) References Cited

U.S. PATENT DOCUMENTS

| | | | | |
|---|---|---|---|---|
| 5,263,319 A | * | 11/1993 | By ......................... | F16H 61/56 60/356 |
| 5,307,629 A | * | 5/1994 | By ......................... | F16H 45/02 60/342 |
| 9,689,492 B2 | * | 6/2017 | LaVoie ................... | F16H 41/26 |
| 9,719,589 B2 | * | 8/2017 | Depraete ................ | F16H 41/30 |
| 10,527,144 B1 | * | 1/2020 | Brevick .................. | F16H 61/56 |
| 10,711,873 B2 | * | 7/2020 | Krause ................... | F16H 45/02 |
| 11,414,993 B1 | * | 8/2022 | Di Paola ............... | F01D 5/3015 |
| 11,434,986 B1 | | 9/2022 | Brevick | |
| 11,898,625 B1 | * | 2/2024 | Reimchen ............... | F16H 41/24 |
| 2003/0173177 A1 | * | 9/2003 | Tomiyama .............. | F16H 45/02 192/3.29 |
| 2007/0224042 A1 | * | 9/2007 | Brees ..................... | F04D 29/542 415/208.2 |
| 2014/0251746 A1 | * | 9/2014 | Ito ........................... | F16D 3/12 192/70.11 |
| 2016/0047469 A1 | * | 2/2016 | LaVoie ................... | F16H 61/56 60/354 |
| 2017/0138455 A1 | * | 5/2017 | Depraete ................ | F16H 41/30 |
| 2018/0283547 A1 | * | 10/2018 | Depraete ................ | F16H 61/56 |
| 2018/0335119 A1 | * | 11/2018 | Cai ......................... | F16H 45/02 |
| 2019/0353233 A1 | * | 11/2019 | Derhammer ............ | F16H 41/26 |
| 2019/0353234 A1 | * | 11/2019 | Vanni ...................... | F16H 61/54 |
| 2019/0353235 A1 | | 11/2019 | Derhammer et al. | |
| 2019/0383375 A1 | * | 12/2019 | Krause ................... | F16H 41/28 |
| 2020/0063863 A1 | * | 2/2020 | Brevick ................. | F16H 41/28 |

FOREIGN PATENT DOCUMENTS

EP 276411 A * 8/1988 ............. F16H 41/26

* cited by examiner

*Primary Examiner* — Brian Christopher Delrue
(74) *Attorney, Agent, or Firm* — Volpe Koenig (57) ABSTRACT

A modular stator for a torque converter includes a stator hub, an outer ring, and a plurality of blades extending radially between the stator hub and the outer ring. Each blade is releasably securable to the stator hub in at least two different orientations. A blade angle of the plurality of blades can be predetermined by selecting one of the at least two orientations. A lock member secures each blade at the selected orientation.

16 Claims, 6 Drawing Sheets

MODULAR TORQUE CONVERTER STATOR WITH CAMMED BLADES

TECHNICAL FIELD

The present disclosure relates generally to torque converters and, more particularly, to torque converter stators.

BACKGROUND

Automatic transmissions may include a torque converter for coupling a transmission input shaft to a crankshaft of an engine. The torque converter may include a pump having an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the plates and disks.

The stator redirects fluid returning from the turbine so that the fluid is rotating in the same direction as the impeller. The stator includes a plurality of blades. The angle of the stator blades has a very large effect on the torque converter's hydrodynamic characteristics including the speed and torque transferred from the engine to the transmission in a vehicle. Given the same pump and turbine, different operating characteristics can be achieved just by changing the stator blade angle. In normal practice, this requires an entirely new stator to be cast.

One type of solution to the problem of requiring a separate stator for each different torque converter characteristic curve is to design a stator whose blades can pivot to change a blade angle. This usually requires some type of complex adjustment mechanism, as well as an additional flow passage in the torque converter to actuate the adjustment mechanism. While such assemblies allow stator blade angles to be changed in real time during operation of a torque converter, they are also complex and expensive to develop and manufacture.

SUMMARY

Embodiments according to this disclosure provide a modular stator for a torque converter with blades that are selectively fixable at a plurality of angles. A particular blade angle can be selected upon assembly for a particular application thereby making the modular stator usable in a variety of applications.

In accordance with one aspect of the present disclosure, a stator for a torque converter comprises a stator hub, a stator outer ring (e.g., stator hat), and a plurality of blades extending radially between the stator hub and the stator outer ring. Each blade is releasably securable to the stator hub in at least two different orientations, and a blade angle of the plurality of blades can be predetermined by selecting one of the at least two orientations.

Each blade can include a protrusion received in a corresponding slot of the hub, each blade can be rotatable about an axis extending through the protrusion between the at least two orientations, and a lock member inserted in the slot can restrict rotation of the protrusion. The protrusion can include a cam having a flat, and the lock member can include a surface adapted to engage the flat to restrict rotation of the blade. The surface adapted to engage the flat can be angled, whereby an orientation of the blade is determined by the angle of the surface adapted to engage the flat. Each blade can include a radially-outwardly extending post, and each post can be received in a slot of the outer ring. The outer ring can include a split outer ring having two halves secured together. The protrusion can extend in a radial direction into the corresponding slot in the hub and the lock member can extend in an axial direction into the corresponding slot. A side plate can be secured to the hub, the side plate extending radially outwardly beyond the lock member to restrict axial movement of the lock member. The side plate can be bolted to the hub. The protrusion can have a t-shape profile.

In accordance with another aspect of the present disclosure, a method of assembling a modular stator for a torque converter comprises providing a stator hub, an outer ring, and a plurality of blades, positioning the plurality of blades in one of at least two orientations radially between the stator hub and the outer ring, and fixing the plurality of blades to the stator hub.

Each blade can include a protrusion, and positioning the plurality of blades can include inserting the protrusion of each blade in a corresponding slot of the hub. Fixing the plurality of blades to the stator hub can include inserting a lock member in a respective slot of the hub to restrict rotation of the protrusion. The protrusion of each blade can include a cam having a flat, and the lock member can include a surface adapted to engage the flat to restrict rotation of the blade. The surface adapted to engage the flat can be angled, whereby an orientation of the blade is determined by the angle of the surface adapted to engage the flat. Each blade can include a radially-outwardly extending post received in a respective slot of the outer ring. The outer ring can include a split outer ring having two halves secured together. The protrusion can extend in a radial direction into the corresponding slot in the hub and the lock member can extend in an axial direction into the corresponding slot. The method can include securing a side plate to the hub, the side plate extending radially outwardly beyond the lock member to restrict axial movement of the lock member. The side plate can be secured with bolts.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
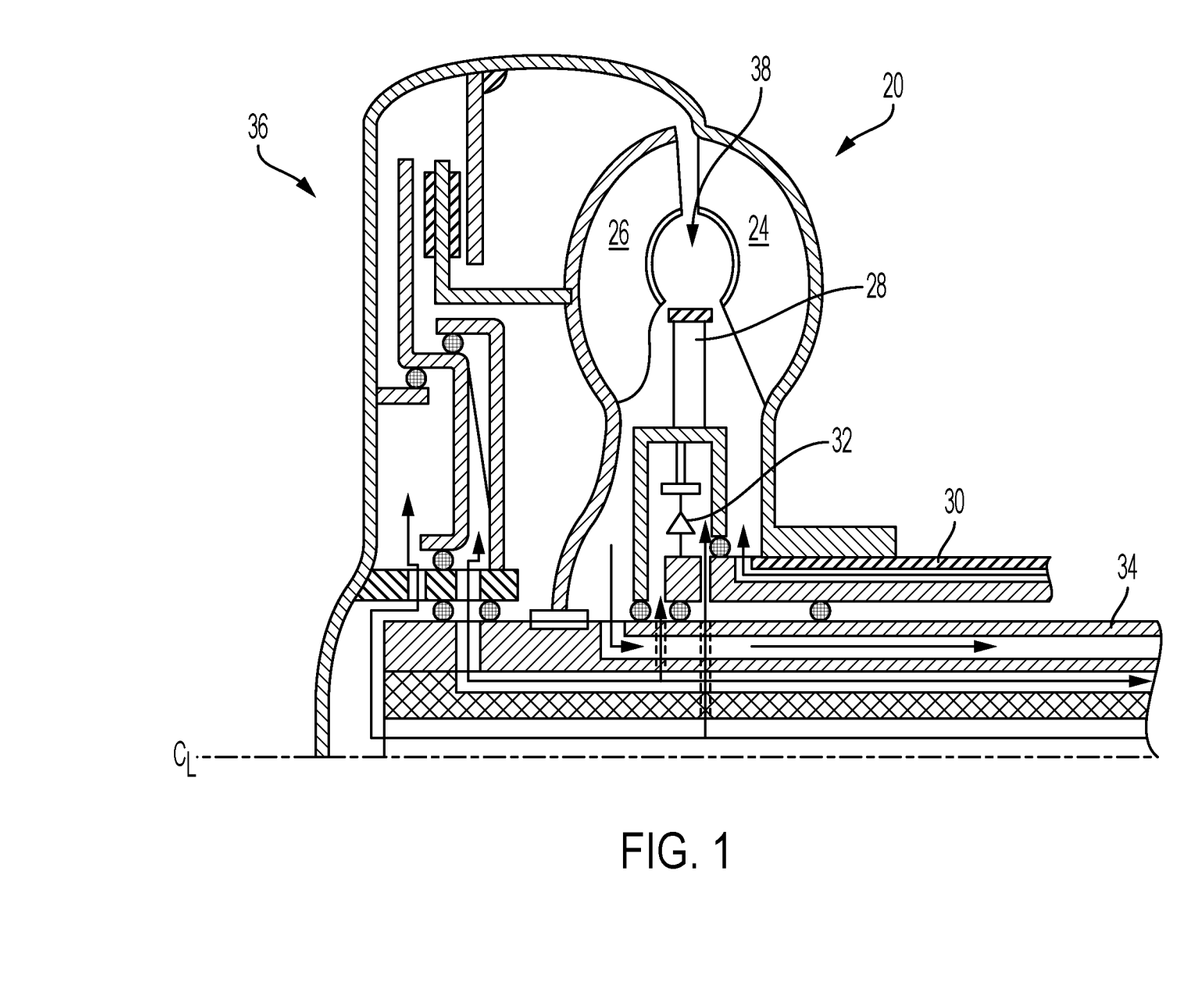
FIG. 1 is a cross-sectional view of an exemplary torque converter.
Figure 2:
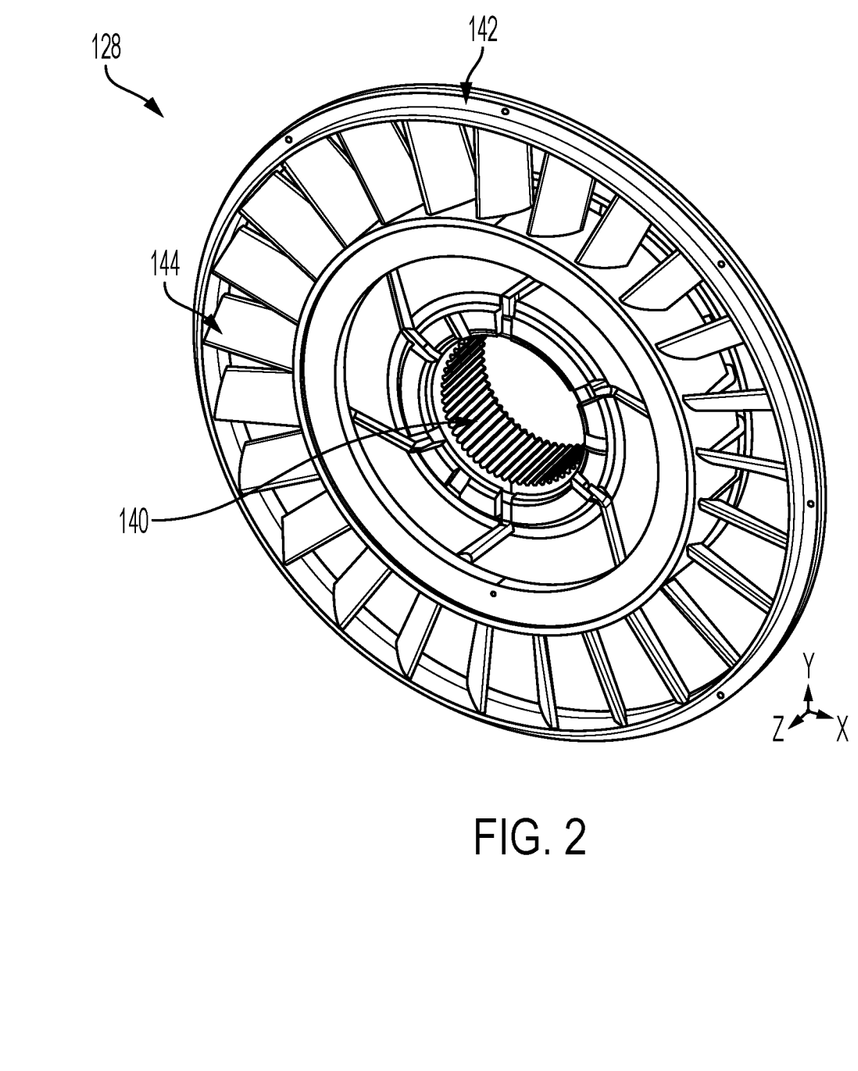
FIG. 2 is a perspective view of a first side of an exemplary stator for a torque converter in accordance with the present disclosure.
Figure 3:
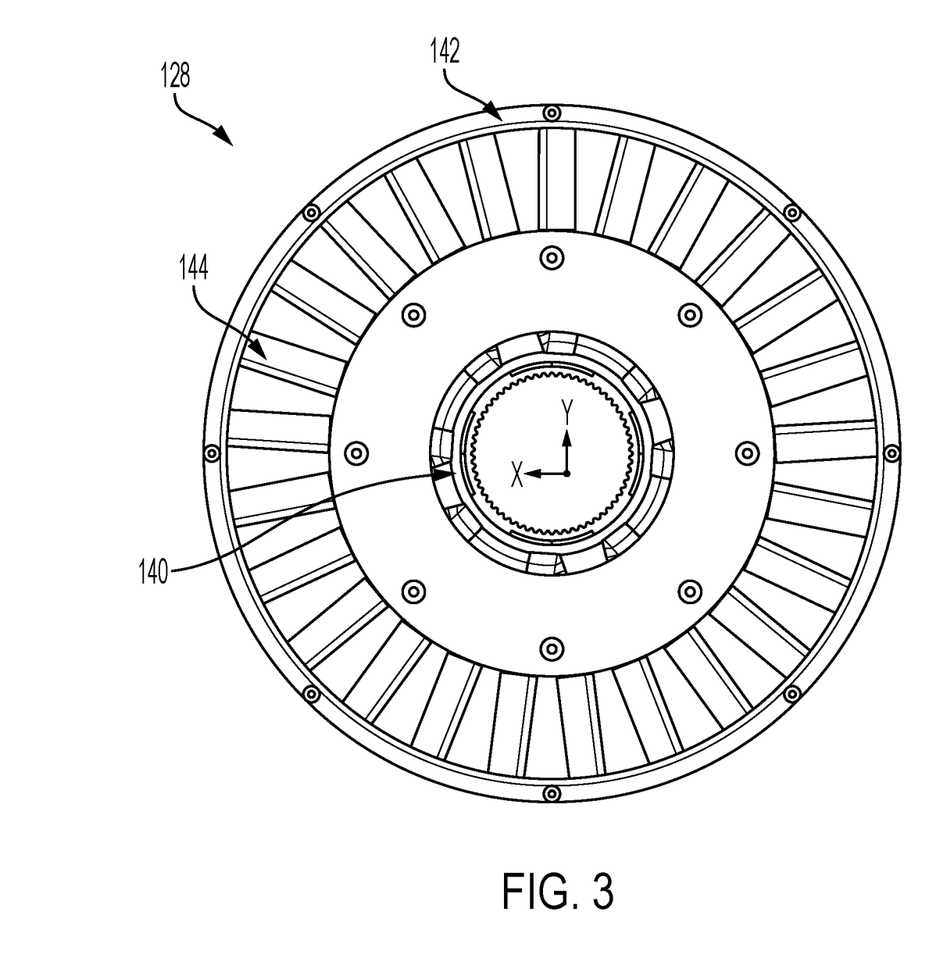
FIG. 3 is a side view of a second side of the torque converter of FIG. 2.
Figure 4:
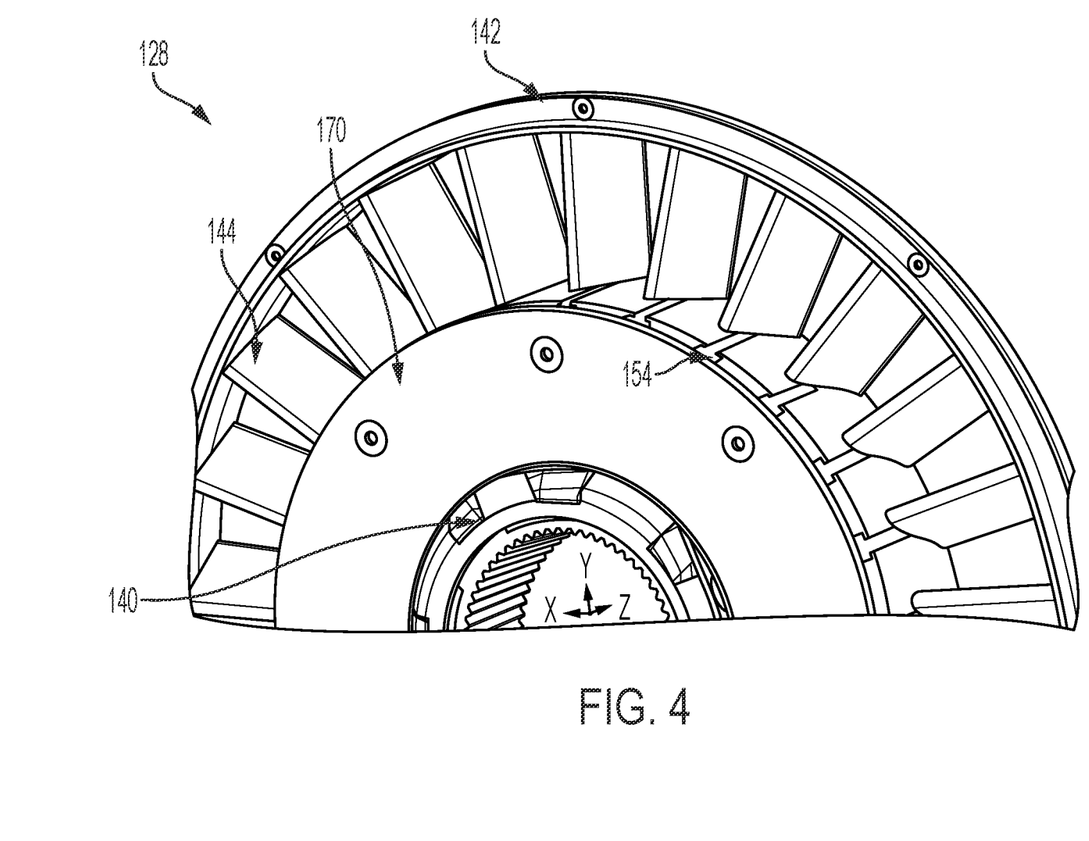
FIG. 4 is a perspective view of the second side of the torque converter of FIG. 2.
Figure 5:
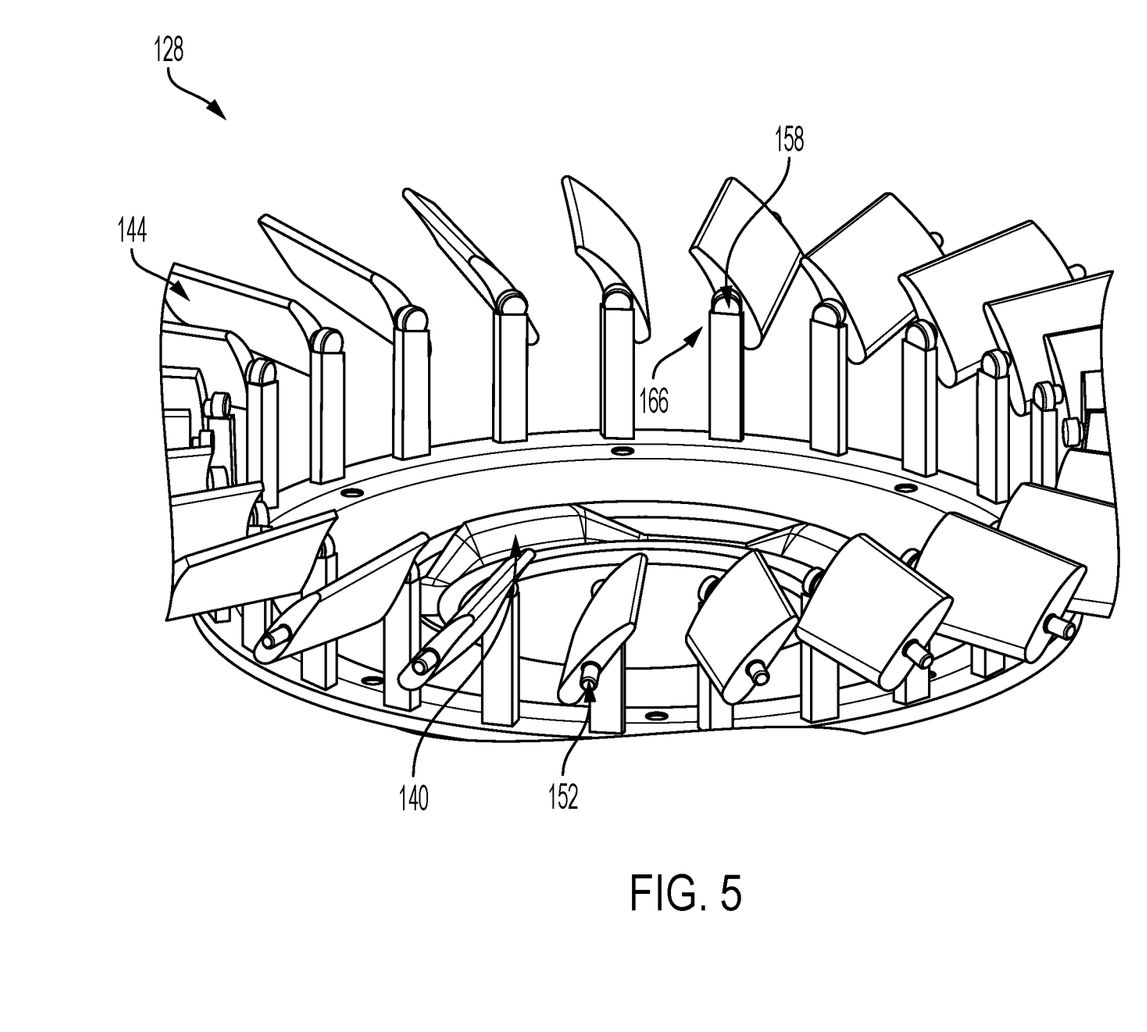
FIG. 5 is a perspective view of the stator with portions thereof removed.
Figure 6:
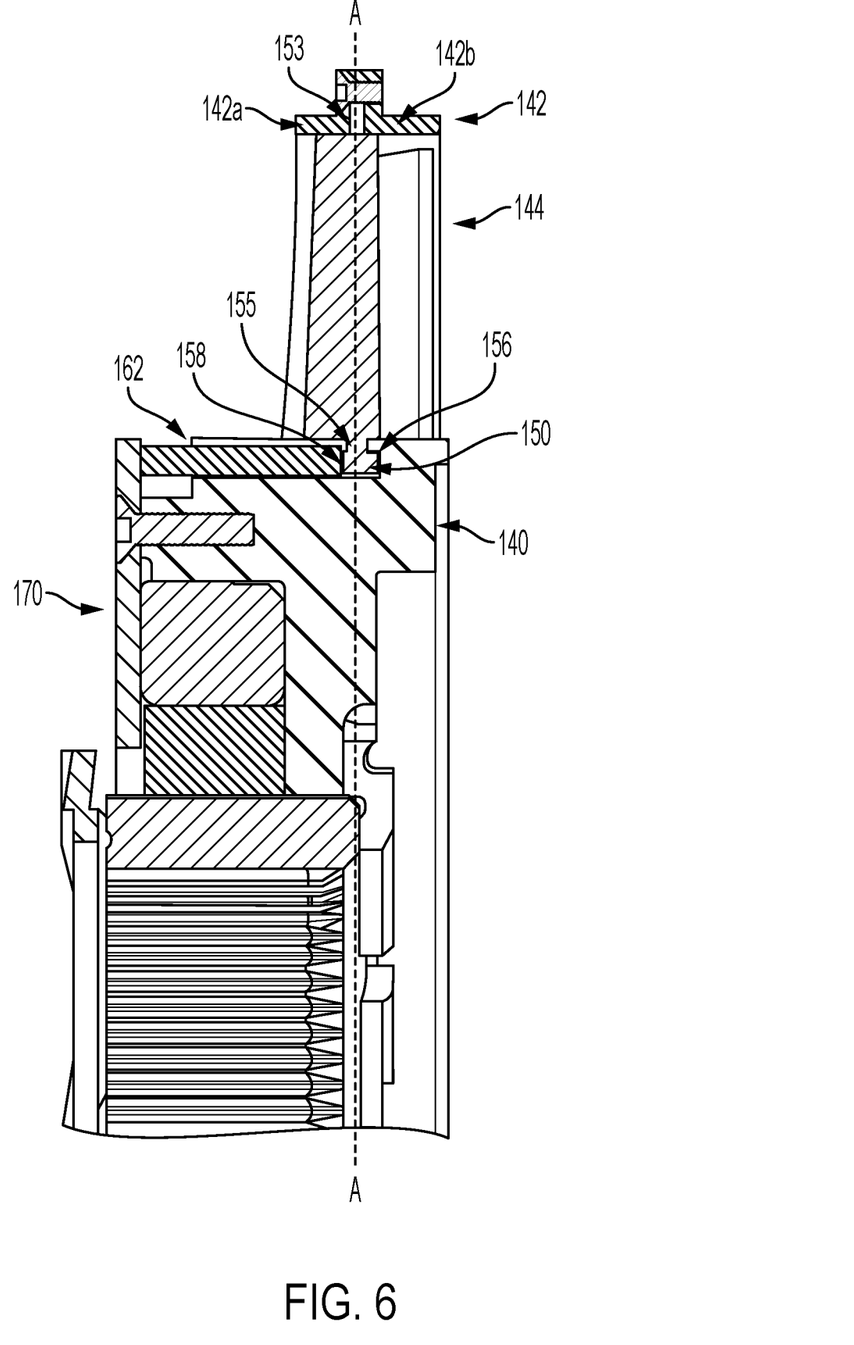
FIG. 6 is a cross-sectional view taken radially through a blade of the stator of FIG. 2.

Referring to FIG. 1, a basic torque converter for a vehicle having an engine and transmission is illustrated and identified generally by reference numeral 20. The torque converter 20 includes a case 22 fixed to a crankshaft of the engine. An impeller 24 is fixed to the case 22 and rotates with the crankshaft. A turbine 26 is disposed adjacent to the impeller 24 within a hydrodynamic chamber 38 of the torque converter 20 and is connected, e.g., splined, to a turbine shaft 34 that supplies power to the transmission. A torsional damper may be interposed between turbine 26 and the turbine shaft 34 to isolate the transmission and other driveline components from engine vibrations.

A stator 28 is coupled to a stator shaft 30 by a one-way clutch 32. The stator shaft 30 is fixed to a front support of the transmission and is stationary relative to the torque converter 20. When the turbine shaft 34 is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. When the speed of the turbine 26 approaches that of the impeller 24, fluid tends to flow around the centerline of the torque converter, causing the one-way clutch 32 to overrun.

Power flow through the hydrodynamic power flow path is governed by the speed of the impeller 24 and the speed of the turbine 26. The relationship between the speeds and the torques is a function of torus geometry and blade angles of the impeller, turbine and stator. At a constant turbine speed, both the impeller torque and the turbine torque increase as impeller speed increases. A torque converter designed to exert a higher resistance torque on the impeller at a given impeller and turbine speed is called a stiffer or tighter converter, whereas a torque converter designed to exert a lower torque for the same impeller and turbine speed is called a looser converter. The tightness of a torque converter may be expressed as a K-factor that relates the impeller torque to the impeller speed. A low K-factor indicates a tight converter while a high K-factor indicates a loose converter. The ratio of the turbine torque to impeller torque generally increases as the ratio of impeller speed to turbine speed increases. The product of the speed ratio and the torque ratio is the converter efficiency, which varies between zero and one as a function of impeller speed and turbine speed.

In typical fixed stators, a compromise K-factor is chosen to balance the competing goals of operating the engine at lower speeds where the engine is more efficient, i.e., a tighter state, and operating the engine at higher speeds where the engine produces more power, i.e., a looser state.

Turning to FIGS. 2-6, and in accordance with the present disclosure, an exemplary stator with adjustable blades is illustrated and identified generally by reference numeral 128. The stator 128 includes a hub 140, an outer ring 142 encircling the hub 140, and a plurality of blades 144 circumferentially arranged between the hub 140 and the outer ring 142. Each of the blades 144 are positioned with a fixed blade angle relative to a central axis of the stator 128. As will be described in more detail below, the blade angle can be selected and fixed at the time of assembling the stator 128. Accordingly, the stator 128 can be customized for use in a wide range of applications.

Each stator blade 144 includes a first protrusion in the form of a cam 150 at a radially inner end adapted to be received in a respective slot 154 of the hub 140. A second protrusion in the form of a pin 152 extends from a radially outer end of the stator blade 144 and is adapted to be received in a corresponding bore 153 of the outer ring 142. Together, the cam 150 and pin 152 define axles that permit the stator blade 144 to rotate about an axis A-A. The cam 150 has a t-shape profile including a stem 155 and a head 156. The head 156 includes a flat 158. The cam 150 is rotatable within the slot 154 to set a desired blade angle. A blade pin 162 (lock member) is inserted axially in the slot 154 and includes an angled face 166 adapted to engage the flat 158 of the cam 150 to secure the blade 144 at a particular angle. The angled face 166 of the blade pin 162 is selected to maintain a particular blade angle. During assembly, a particular set of blade pins can be selected from a plurality of sets of blade pins having differently angled faces. Once the blade pins 162 are installed in the slots 154 of the hub 140, an extended stator sideplate 170 is bolted to the hub 140 to axially restrain the blade pins 162. With the blades 144 secured on the hub 140, two halves 142a and 142b of the outer ring 142 are bolted together capturing the pins 152 of each blade 144 in respective bores 153.

It should be appreciated that, in the installed position, the blade pins 162 interfere with the flats 158 preventing rotation of the blades 144. Accordingly, the blades 144 are fixed and the blade angle cannot be changed unless the torque converter 128 is at least partially disassembled.

The stator 128 can be disassembled and reassembled in this manner using pins 162 with differently angled faces that interface with the flats 158 of the cams 150, thereby changing the blade angles and, thus, the hydrodynamic characteristics of the torque converter. In practice, the stator 128 can be configured for use with a range of engine and transmission combinations.

Although bolted connections are shown for securing the various components of the exemplary embodiment, it will be appreciated that other connections can be used, such as welded connections, in place of or in addition to the bolted connections.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

20 torque converter
22 case
24 impeller
26 turbine
28 stator
30 stator shaft
32 clutch
34 turbine shaft
38 hydrodynamic chamber
128 stator
140 hub
142 outer ring
142a outer ring half
142b outer ring half
144 blades
150 cam
152 cylindrical pin
153 bore
154 slot
155 stem
156 head
158 flat
162 blade pin
166 angled face
170 sideplate

What is claimed is:

1. A stator for a torque converter comprising:
   a stator hub;
   an outer ring; and
   a plurality of blades extending radially between the stator hub and the outer ring, the plurality of blades being fixed against rotation relative to the stator hub; and
   a plurality of lock pins, each lock pin received in the stator hub and securing a respective one of the plurality of blades in a fixed orientation.

2. The stator according to claim 1, wherein each blade includes a protrusion received in a corresponding slot of the hub, wherein the protrusion includes a cam having a flat, wherein the lock pin includes a surface adapted to engage the flat to restrict rotation of the blade, and wherein the surface adapted to engage the flat is angled, whereby the fixed orientation of the blade is determined by the angle of the surface adapted to engage the flat.

3. The stator according to claim 1, wherein each blade includes a cylindrical pin, and each cylindrical pin is received in a slot of the outer ring.

4. The stator according to claim 3, wherein the outer ring includes a split outer ring having two halves secured together.

5. The stator according to claim 2, wherein the protrusion extends in a radial direction into the corresponding slot in the hub and the lock pin extends in an axial direction into the corresponding slot.

6. The stator according to claim 5, further comprising a side plate secured to the hub, the side plate extending radially outwardly beyond the lock pin, whereby the lock pin is axially fixed against movement relative to the hub.

7. The stator according to claim 6, wherein the side plate is bolted to the hub.

8. The stator according to claim 2, wherein the protrusion has a t-shape profile.

9. A method of assembling a modular stator for a torque converter comprising:
   providing a stator hub, an outer ring, and a plurality of blades;
   positioning the plurality of blades in one of at least two orientations radially between the stator hub and the outer ring;
   and fixing the plurality of blades to the stator hub against rotation about a radial axis;
   wherein each blade includes a protrusion, and wherein positioning the plurality of blades includes inserting the protrusion of each blade in a corresponding slot of the hub;

wherein fixing the plurality of blades to the stator hub includes inserting a lock pin in a respective slot of the hub to restrict rotation of the protrusion.

10. The method according to claim 9, wherein the protrusion of each blade includes a cam having a flat, and wherein the lock pin includes a surface adapted to engage the flat to restrict rotation of the blade.

11. The method according to claim 10, wherein the surface adapted to engage the flat is angled, whereby an orientation of the blade is determined by the angle of the surface adapted to engage the flat.

12. The method according to claim 11, wherein each blade includes a radially-outwardly extending cylindrical pin received in a respective slot of the outer ring.

13. The method according to claim 12, wherein the outer ring includes a split outer ring having two halves secured together.

14. The method according to claim 9, wherein the protrusion extends in a radial direction into the corresponding slot in the hub and the lock pin extends in an axial direction into the corresponding slot.

15. The method according to claim 14, further comprising securing a side plate to the hub, the side plate extending radially outwardly beyond the lock pin to restrict axial movement of the lock pin.

16. The method according to claim 15, further comprising bolting the side plate to the hub.

\* \* \* \* \*